Dec. 12, 1950 A. L. SAMUEL 2,533,512

ULTRA HIGH FREQUENCY IONIC DISCHARGE SWITCH DEVICE

Filed Sept. 26, 1945 2 Sheets-Sheet 1

INVENTOR
A. L. SAMUEL
BY [signature]
ATTORNEY

Dec. 12, 1950 A. L. SAMUEL 2,533,512

ULTRA HIGH FREQUENCY IONIC DISCHARGE SWITCH DEVICE

Filed Sept. 26, 1945 2 Sheets-Sheet 2

INVENTOR
A. L. SAMUEL
BY [signature]
ATTORNEY

Patented Dec. 12, 1950

2,533,512

UNITED STATES PATENT OFFICE 2,533,512

ULTRA HIGH FREQUENCY IONIC DISCHARGE SWITCH DEVICE

Arthur L. Samuel, Summit, N. J., assignor to Bell Telephone Laboratories, Incorporated, New York, N. Y., a corporation of New York Application September 26, 1945, Serial No. 618.762

9 Claims. (Cl. 315—5)

This invention relates to ionic discharge devices and more particularly to such devices of the gas discharge type especially suitable for switching purposes in ultra-high frequency transmission systems.

Gas discharge spark-gap devices of one type to which this invention appertains, are especially useful in object location and distance measuring systems wherein recurring pulses of high frequency and periodicity are transmitted to a distant object to be located or the distance to which is to be measured and the reflected pulses from the object are returned to the receiver at the transmitting or observation point. Since the transmitter and receiver of such systems usually operate over a common wave transmission line, such as a wave guide channel, with a duplex antenna, proper selective control of the high frequency energy traversing the line is required in order to protect the respective receiver and transmitter alternately in the system from high voltage surges and energy loss during the transmitting and receiving cycles.

When pulse generating energy is supplied to the antenna by the transmitter, the receiver is by-passed through the short-circuiting action of a resonant gas-filled switching device, called a TR switch, to reduce the voltage applied to the receiver and thereby prevent the absorption of energy by the receiver. On the arrival of the reflected pulse energy to the system, from the distant object, it is expedient to effectively disconnect the transmitter and utilize the maximum strength of the signal to impress the results upon the receiver without substantial loss. This is accomplished by a second resonant gas-filled switching device, called an RT switch or anti-TR switch, which short-circuits the transmitter and permits the receiver to absorb practically the full strength of the returning pulse energy. A typical duplex transmission system operating on the above-mentioned principle is disclosed in my copending application, Serial No. 474,122, filed January 30, 1943.

While both resonant switching devices perform similar disconnect functions, the anti-TR switching device or transmitter disconnect switch must operate with a minimum of loss in the available power present during the receiving pulse cycle in spite of the fact that the transmitter reactance may series resonate with the anti-TR switch. This requires a construction more exacting than the TR switching devices, particularly in broad-band systems, since the RT switch must present a resulting impedance mismatch to limit the power dissipated in the device during the high voltage transmitting period and also must operate readily during the low voltage or receiving period to short-circuit the pulse generating transmitter and thereby increase the ratio of input impedance to the line impedance.

An object of this invention is to efficiently control the breakdown characteristics of the switching device so that low loss is realized in the transmission system.

Another object of the invention is to reduce leakage power in the discharge device and thereby increase the resonance level of the discharge path in the device.

A further object of the invention is to maintain the impedance characteristics substantially constant, thereby to increase the operating life of the device.

Another object of the invention is to enable performance of the switching function of the system without manual tuning of the device to match the impedance of the impulse energy and to provide a device having a low-Q characteristic.

These objects are attained in accordance with features of this invention by providing a pretuned regulated discharge path in the device for controlling the discharge characteristics of the resonant short-circuiting impedance afforded by the disconnect switch in the transmission line. This is accomplished in a broad-band resonant transmitter disconnect device having a chamber filled with a gas at low pressure and provided with a transparent sealed window in one end presented to the path of the reflected energy wave and constructed to constitute an inductive component of the resonant circuit of the device. Behind the window and enclosed in the vessel of the device is a planary spark-gap electrode, having a prescribed configuration to provide a restricted discharge gap, which functions to break down the gas and convert the high impedance system extant in the case of the unfired discharge to a low impedance network. This network defines a shunt path across the transmission line to form effectively a short-circuiting disconnect means for the transmitting pulse generator. The spark-gap electrode is dimensioned to introduce the desired capacitance and inductive components in the shunt path formed by the network, to tune the device to the midband frequency. A resonator cavity is located in juxtaposition to the spark-gap electrode to tune the device to the limit frequencies of the broadband system in which it is used.

A feature of the invention relates to the assembly of the components in the device so that the discharge takes place at minimum power levels, with low striking voltage and reduced power consumption, whereby operating life is prolonged and substantially constant operating characteristics are realized. This is accomplished by controlling the breakdown discharge in the device so that the spark-gap is easily ignited during the transmitting cycle.

Another feature of the invention relates to a further refinement of the spark-gap electrode in the device to prevent sputtering of the electrode and thereby preserve the electrical constants of the resonant network in the device. This is accomplished by providing a protective non-disintegrating coating or film on the sparking points of the electrode to minimize sputtering of the metal of the electrode and thereby insure stable characteristics in the device.

These and other features of the invention are set forth in greater detail in the following specification and shown in the accompanying drawings.

Figure 4:
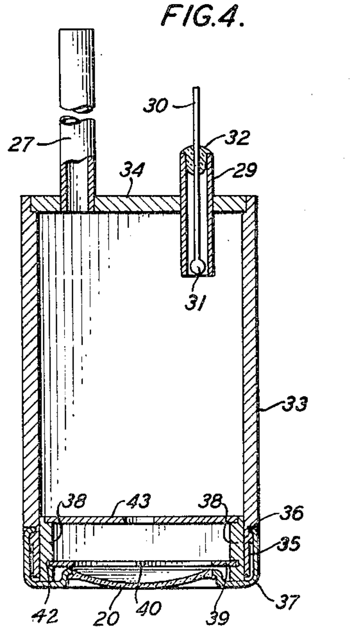
Fig. 4 illustrates another form of device constructed in accordance with the invention in a cross-sectional view showing the internal assembly of the elements.
Figure 5:
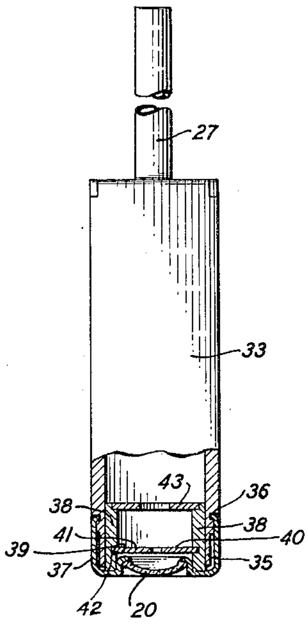
Fig. 5 is a view in elevation, partly in cross-section, of the device of Fig. 4 from a different angle.
Figure 6:
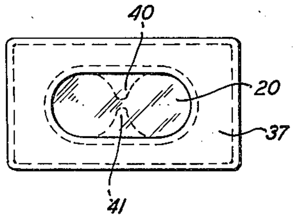
Fig. 6 is a plan view of the lower end of the device of Fig. 4 showing the configuration of the window seal constituting the closure end of the device.

The RT or anti-TR switching device in ultra-high frequency systems of the general type and organization noted heretofore must meet certain requirements to assure satisfactory performance and a minimum of loss of signal energy during the receiving periods. In addition to satisfaction of requirements of loss at low and high signal levels, the device should have low leakage power, low noise, operating characteristics substantially independent of temperature, long operating life and a prescribed operating band width. These functional requirements are met efficiently in the typical constructions in accordance with this invention as shown in Figs. 1 and 4.

Figure 1:
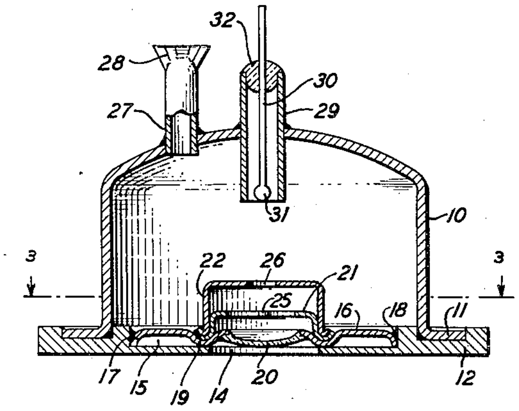
Fig. 1 is an elevational view, in cross-section, showing one form of the resonant spark-gap discharge device constructed in accordance with this invention, and the relationship of the elements within the casing.
Figure 2:
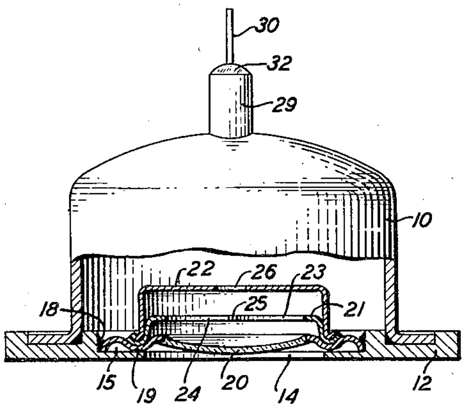
Fig. 2 is another view of the device of Fig. 1 partly in section and showing the configuration of the elements in a direction 90 degrees with respect to Fig. 1.
Figure 3:
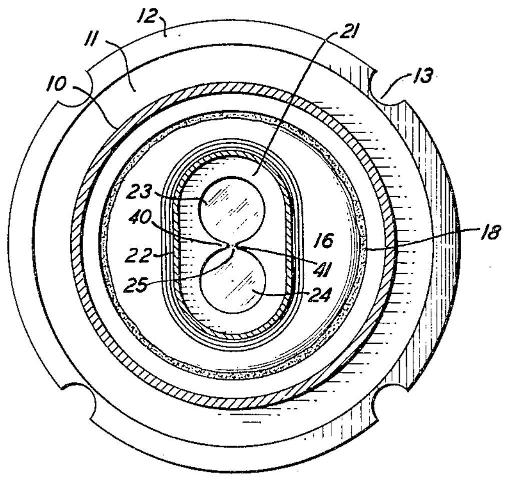
Fig. 3 is a plan view of the device taken on the lines 3—3 of Fig. 1.

The details of assembly of the device of Figs. 1 to 3 involve an inverted cup-shaped metallic casing 10 having a flange 11 affixed, for example by soldering, in a circular groove of an annular choke fitting or ring 12 having spaced semi-circular slots 13 for clamping the device or tube to a circular frame coupling, not shown, of a wave guide transmission line in proper relation to the magnetron oscillation generator, as set forth in the above-mentioned pending application.

The choke ring has a central oval opening 14 leading into a coaxial circular recess 15 which forms a seat for a punched metallic frame member 16 having a turned peripheral edge 17 sealed to the recess wall, preferably by solder 18, and having a nodular inner rim 19 engaging the ring 12 adjacent the opening 14, the frame member having an oval aperture of slightly smaller dimensions than the opening 14 in the choke ring.

The pre-formed frame member 16 advantageously is made of a nickel-iron-cobalt alloy, such as "Kovar," having the desired coefficients of expansion and contraction compatible with certain grades of borosilicate or "hard" glass, to form an air-tight joint at the boundary of the rim 19 with a short wave energy transparent window 20, formed of appropriate glass and sealed in the oval aperture of the frame member 16. The window is sealed in the frame to form an outwardly bowed closure for the frame, although a substantially optically flat window would serve the same purposes of this invention in so far as insuring an efficient seal which would not develop strains liable to crack the sealed joint.

The oval window is so dimensioned as to constitute an inductive reactance over a preassigned wavelength range, e. g. from 3.13 to 3.53 centimeters, and is formed during the heat sealing step to press the window into contact with the "Kovar" frame member, which is also heated, preferably by high frequency induction methods, to insure a tight hermetic joint at the juncture of the glass and metal edges. The window 20 is made as large as practical with mechanical requirements so that the Q-characteristic is low and the vacuum-type window forms a nearly resonant impedance over a substantial, e. g. 12 per cent, frequency range. The window, frame, and choke ring, therefore, form an accurately dimensioned closure for the casing of the device in which the punched frame member 16 readily compensates for heat cycle changes during operation and prevents undue stresses being set up in the vitreous transparent window sealed in the input end of the device.

The nodular rim 19 of the frame member also forms a well on the internal surface of the frame for locating a pair of nested components comprising an inner cup-shaped, pre-formed electrode 21 of oval configuration and having a curved flange soldered in the rim 19, and a deeper cup-shaped metallic chamber 22 of similar configuration, likewise soldered into the rim 19, to coaxially center these components in accurate spaced relation to the transparent window. The electrode 21 advantageously is formed of a relatively thin metal, such as copper of .010 inch thickness, the thin metal being reenforced by the cup-shaped formation of the electrode. The planary surface of the electrode, spaced from the window, is provided with two symmetrical tangent openings 23 and 24, preferably circular, which at the point of tangency are cut to form a passageway or gap 25 of about .020 inch. The circular openings 23 and 24 and gap 25 of the electrode constitute an inductance and capacity, respectively, of a parallel resonant circuit which is adjusted to be resonant at a wavelength slightly beyond the long wavelength limit of the operating band. The deeper cup-shaped component 22, also formed of copper, defines a cavity resonator providing an additional inductance to resonate the entire structure to the mid-band frequency. The cup-shaped member 22 is provided with a central aperture 26 to form a restricted outlet between the successive cavities interposed between the window, electrode and auxiliary chamber and the large chamber in the casing 10. The latter contains a filling of inert gas, such as argon, at a pressure from 5 to 50 millimeters of mercury. The gas-filling is introduced through an offset metallic tubulation 27 soldered in the top wall of the casing 10, after proper exhaust of the casing, and the tubulation is sealed off by pinching, as shown at 28, Fig. 1, with a sealing tool.

The optimum pressure of gas in the device depends on the power consumption for which the device is designed. For lowest power absorbed and consequently for longer life a pressure of 40 millimeters of mercury is desirable. For special applications where a very low power transmitter (50 to 100 peak watts) is employed, a pressure of 10 millimeters of mercury is satisfactory. Such a device has been made to fire satisfactorily with line power as low as 10 to 15 watts peak power. Because of the shorter radio frequency discharge path provided by the spark-gap electrode 21, there is a difference factor in minimum power levels of at least 100 over a similar device without the electrode. The critical gas pressure requirements of the device are regulated and predetermined by providing an auxiliary spark-gap extending into the gas space to measure the pressure and determine the appropriate value. This is accomplished by providing a coaxial spark-gap extending into the top of the casing 10 as represented by a central metallic tubing 29, preferably of "Kovar," which is soldered intermediate its ends into an opening in the casing, with a central conductor 30 having an enlarged sparking head 31 adjacent the inner end of the tubing coaxially extending through the tubing and being sealed therein by a glass bead 32.

To meet the necessary edge band impedance requirements in a broad-band system of the type designated, a low Q-construction is essential, Q being defined as the ratio of inductance to resistance in the circuit. On the other hand an impedance transformation is desirable to reduce the power level required to fire the discharge gap and to minimize the gas discharge power after the discharge has been established. This necessarily increases the apparent Q. The problem, then, is in securing as large a voltage step-up as is consistent with the band width requirements. This is accomplished by correlating the electrical parameters of the components of the device by dimensional determination of the elements to satisfy the circuit requirements. The Q of the window is made as low as possible by making the physical dimensions in the direction of the E component of the field high as possible consistent with mechanical limitations, and the spark-gap electrode is made very thin, i. e., .010 inch and spaced from the window to introduce the desired series inductance. This is accompanied by an appreciable reduction in the value of the gap capacitance because of the decrease in the fringing fields through the glass window. Because of this effect, an appreciable voltage step-up is possible without introducing an increase in Q.

In addition to a low inductance vs. resistance characteristic for broad-band operation, the RT switching device should have a low power loss in the gas discharge and the input impedance should be large in the unfired state to attain optimum preformance in the resonant circuit of the system. This is accomplished by correlating the values of inductance and capacity of the window 20, electrode 21 and cavity chamber 22 together with the space relation between these elements so that the combined structure functions as a shunt resonant circuit with definite values for edge-band impedance. This impedance is in series with the transmitter and effectively open-circuits the transmitting branch of the system, so that practically no energy loss is absorbed in the generator. When the discharge is fired in the restricted gap 25 of the internal spark-gap electrode, the shunt path of the electrode short-circuits the high series impedance thereby presenting a low impedance network for the transmitting signal energy.

Another form of the invention is shown in Fig. 4, which embodies an elongated rectangular metallic casing 33 having an apertured closure wall 34 on one end for the location of the exhaust tubulation 27 and the coaxial spark-gap tube 29. The opposite end of the casing has a reduced wall section 35 with a rearwardly extending slot 36 around the circumference of the casing to receive a punched or stamped frame cap member or closure 37. The cap member or closure 37 has its rim turned into the slot 36, the member or closure being soldered or brazed to the casing to form a tight seal. The cap 37 advantageously is formed of "Kovar" alloy to match the expansion characteristics of the glass window 20 which is hermetically sealed thereto and completes the input end of the device for initiating the breakdown of the gaseous discharge path in the device.

Within the casing 33 and adjacent the transparent window closure are four metallic wall inserts 38 abutting against the internal wall of the casing and resting against the frame cap 37 to form a wall boundary of less diameter than the casing. These inserts are rigidly fixed in position, for example by solder, to form spacers for a planary electrode 39, of thin copper sheet, similar to the electrode 21, described in connection with Fig. 1, and having the tangent circular cut-out openings 23 and 24 and the restricted spark-gap 25 to form a pair of opposed pointed projections 40 and 41 centrally located behind the window 20. The electrode is seated in slots 42 in the inserts 38 to proportion the cavity between the window and the electrode so that the desired inductance is introduced in the resonant circuit of the device. The inserts also together with an apertured partition member 43 provide an additional cavity or chamber in the rear of the spark-gap electrode 39 to form an auxiliary resonant impedance to tune the device to the desired edge-band frequency limits. The casing is filled with a desired inert gas, such as argon, at an appropriate pressure for the power rating of the device.

Figure 7:
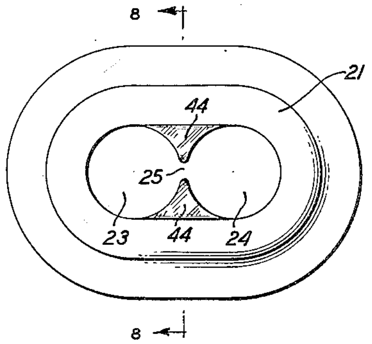
Fig. 7 is an enlarged plan view of the spark-gap electrode, incorporated in the device of Fig. 1, and showing the non-disintegrating coating applied to the spark points of the electrode.
Figure 8:
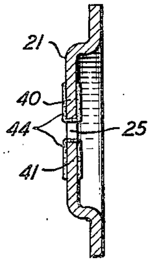
Fig. 8 is a cross-sectional view of the electrode taken on the line 8—8 of Fig. 7.

The relatively thin copper spark-gap electrode, while materially enhancing the rapid breakdown of the high impedance discharge path of the device, necessarily is subjected to considerable heating effect due to the discharge and the spark points 40 and 41 may be eroded by sputtering of metal. Such action changes the capacitance provided by the restricted gap and materially alters the shunt path characteristics of the network circuit. The sputtering or erosion of the delicate points of the electrode may be substantially prevented by coating the spark points with a non-disintegrating film or layer, such as of vitreous material 44, which may be applied as a coating of powdered glass in a suitable binder and heated in an oxidizing atmosphere. This is shown in Figs. 7 and 8 which represent the form of electrode embodied in the device of Fig. 1, although the glaze coating may be applied to the electrode 39 in Fig. 4, for the same purpose. The coating 44, as shown in Fig. 8, completely embeds the points in the protective covering which effectively prevents sputtering of the metallic electrode points and materially lengthens the operating life of the device.

While the invention has been disclosed in various aspects to perform the functional operations of switching the low voltage signal energy in broad-band transmission systems, it is, of course, understood that various changes may be made in the detailed assembly of the construction without departing from the scope of the invention as defined in the appended claims.

What is claimed is:

1. An ionic discharge device comprising a hollow metallic casing open at one end, an annular mounting plate secured to said open end, a metallic frame located in a recess of said plate, a window hermetically sealed in said frame and closing the open end of said casing, a gas filling at low pressure in said casing, a ring member mounted within said casing adjacent and coaxial with said window, a planary electrode element supported by said ring and opposite said window, said element having symmetrical cut-out portions converging toward the center thereof to form projections separated by a short gap, and a cavity resonator chamber separating said electrode element from the remainder of the space in said casing, said chamber having an aperture opening into said casing.

2. An ionic discharge device comprising a hollow metallic casing open at one end, an apertured closure attached to said open end, a window hermetically sealed in said closure, a filling of inert gas within said casing at reduced pressure, a hollow element secured in said casing and forming an apertured partition between said closure and the remainder of said casing, and a thin plate electrode having a spark-gap, mounted on said element and extending across said window.

3. An ionic discharge device comprising a hollow metallic casing open at one end, an apertured closure attached to said open end, a window hermetically sealed in said closure, a filling of inert gas within said casing at reduced pressure, a hollow element secured in said casing and forming an apertured partition between said closure and the remainder of said casing, and a thin plate electrode mounted adjacent said element and having opposed twin point projections forming a spark-gap centrally adjacent said window, said spark gap electrode having inductive and capacitive components forming a shunt reactance for tuning said device to a prescribed frequency.

4. An ionic discharge device comprising a hollow metallic casing open at one end, an apertured closure attached to said open end, a window hermetically sealed in said closure, a filling of inert gas within said case at reduced pressure, a hollow element secured in said casing and forming an apertured partition between said closure and the remainder of said casing, and a thin plate electrode mounted in said element and having a pair of intermeshed symmetrical openings forming projections separated by a short gap to initiate breakdown in the discharge of said device.

5. An ionic discharge device comprising a hollow metallic casing open at one end, an apertured closure attached to said open end, a window hermetically sealed in said closure, a filling of inert gas within said casing at reduced pressure, a hollow element secured in said casing and forming an apertured partition between said closure and the remainder of said casing, a thin plate electrode mounted in said element having opposed metal points forming a spark-gap centrally adjacent said window, and a protective layer on said points.

6. An ionic discharge device comprising a hollow metallic casing open at one end, an apertured closure attached to said open end, a window hermetically sealed in said closure, a filling of gas within said casing at reduced pressure, a hollow element secured in said casing having an aperture opening into said casing, a thin metal plate electrode mounted in said element and having opposed twin points forming a spark-gap adjacent said window, and a vitreous coating applied to said points to prevent sputtering of metal to cloud said window.

7. A gas-filled tuned switching device comprising a hollow metallic casing having an open end, an annular metallic closure extending across the open end of said casing and forming a coupling choke for said device, a sheet metal frame member centrally mounted in said closure and having a central oval opening, a window hermetically sealed in said opening, a filling of argon gas in said casing at a pressure of the order of 40 millimeters of mercury, an inverted cup-shaped element conforming in dimensions to said window area and secured to said frame to constitute a partition within said casing having an aperture opening into said casing, and a metallic disc electrode disposed between said window and said cup member having coplanar projections in opposed relation centrally disposed behind said window, said electrode having rim portions spacing said electrode from said frame.

8. A tuned gas discharge switching device comprising a rectangular casing open at one end, an apertured cap closure affixed to said open end, a substantially flat window hermetically sealed in said cap closure, a filling of argon gas in said casing at a pressure of the order 40 millimeters of mercury, a partition wall in said casing separating said window space from the main gas space to form a resonating chamber, said wall having a restricted aperture opening into said casing, and a thin metallic plate electrode interposed between said partition and said window, said electrode having a pair of tangent openings in convergent relation at the point of tangency and forming a restricted gap centrally behind said window.

9. A tuned gas discharge switching device comprising a rectangular metallic casing open at one end, an apertured cap closure extending across said open end, a glass window hermetically sealed in said closure, inserts mounted in said casing adjacent said window having slotted portions facing toward the interior of said casing, a metallic plate having a central restricted aperture and mounted on said inserts to form a resonator chamber opening into said casing, and a thin metallic electrode engaging said slotted portions and spacing said electrode from said window and having twin symmetrical cut-out portions forming a pair of opposed pointed projections having a restricted gap therebetween centrally located behind said window.

ARTHUR L. SAMUEL.

REFERENCES CITED

The following references are of record in the file of this patent:

UNITED STATES PATENTS

| Number | Name | Date |
|---|---|---|
| 2,106,770 | Southworth et al. | Feb. 1, 1938 |
| 2,288,861 | Walrous Jr. | July 7, 1942 |
| 2,404,116 | Wolowicz et al. | July 16, 1946 |
| 2,413,171 | Clifford et al. | Dec. 24, 1946 |
| 2,413,963 | Fiske et al. | Jan. 7, 1947 |
| 2,416,168 | Fiske | Feb. 18, 1947 |
| 2,427,089 | Clifford | Sept. 9, 1947 |